Figure 1:
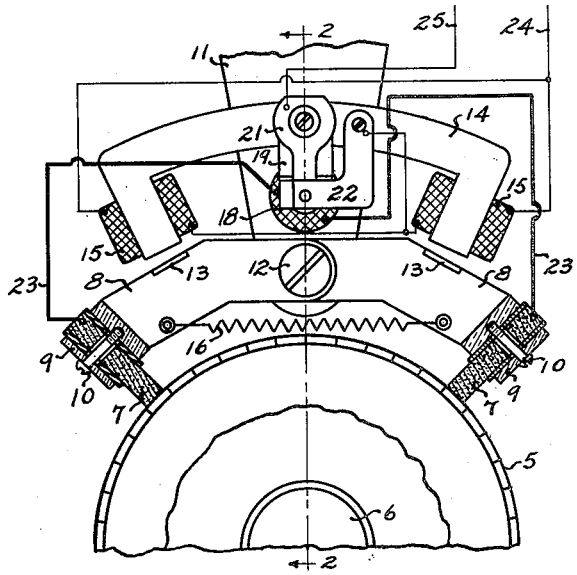

June 17, 1930.  G. R. ANDERSON  1,764,709
BRUSH LIFTER FOR ELECTRIC MOTORS
Filed Dec. 9, 1926   2 Sheets-Sheet 1

INVENTOR
GORDON R. ANDERSON
BY
ATTORNEY

June 17, 1930. G. R. ANDERSON 1,764,709
BRUSH LIFTER FOR ELECTRIC MOTORS
Filed Dec. 9, 1926 2 Sheets-Sheet 2

INVENTOR
GORDON R. ANDERSON
BY
ATTORNEY

Patented June 17, 1930

1,764,709

UNITED STATES PATENT OFFICE

GORDON R. ANDERSON, OF INDIANAPOLIS, INDIANA, ASSIGNOR TO FAIRBANKS, MORSE & CO., OF CHICAGO, ILLINOIS, A CORPORATION OF ILLINOIS

BRUSH LIFTER FOR ELECTRIC MOTORS

Application filed December 9, 1926. Serial No. 153,622.

My invention relates to improvements in brush lifters for electric machines and more particularly to improvements in brush lifters for single phase motors of the type in which a pair of short circuited brushes is employed in starting the machine, which brushes may be lifted off the commutator after the motor gets up to speed and the commutator is short-circuited.

The object of my invention is to provide means for lifting the brushes of a single phase motor, which means are operated electromagnetically and controlled by means of the short-circuit current through the brushes, thereby providing a device, of the class described, which is positive and efficient in its operation.

Further objects and advantages of my invention will appear from the drawing and the following description thereof.

Although my invention consists largely in the construction and arrangement of parts hereinafter described and particularly pointed out in my claims, yet I do not limit my invention to the precise form or construction of parts shown or the several parts thereof, inasmuch as various alterations may be made without changing the scope of my invention.

Figure 2:
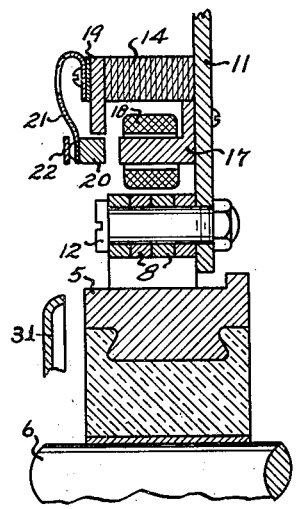
Figure 3:
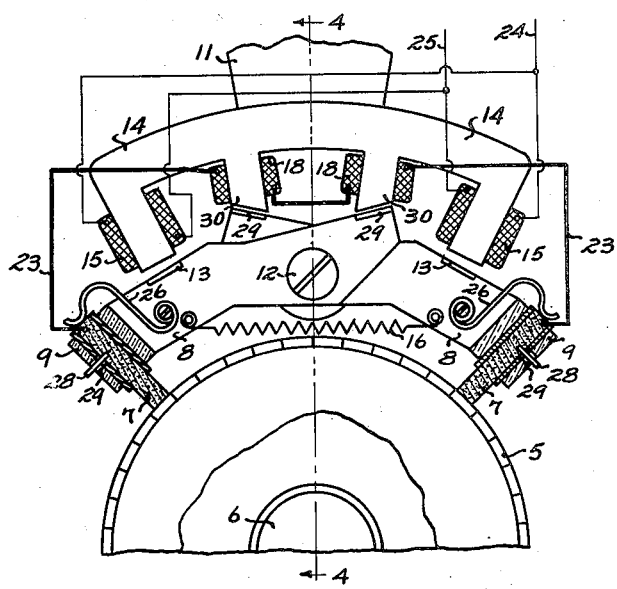
Figure 4:
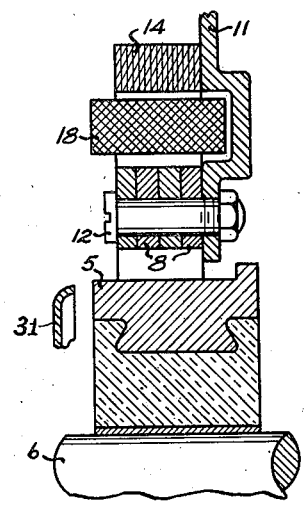
Figure 5:
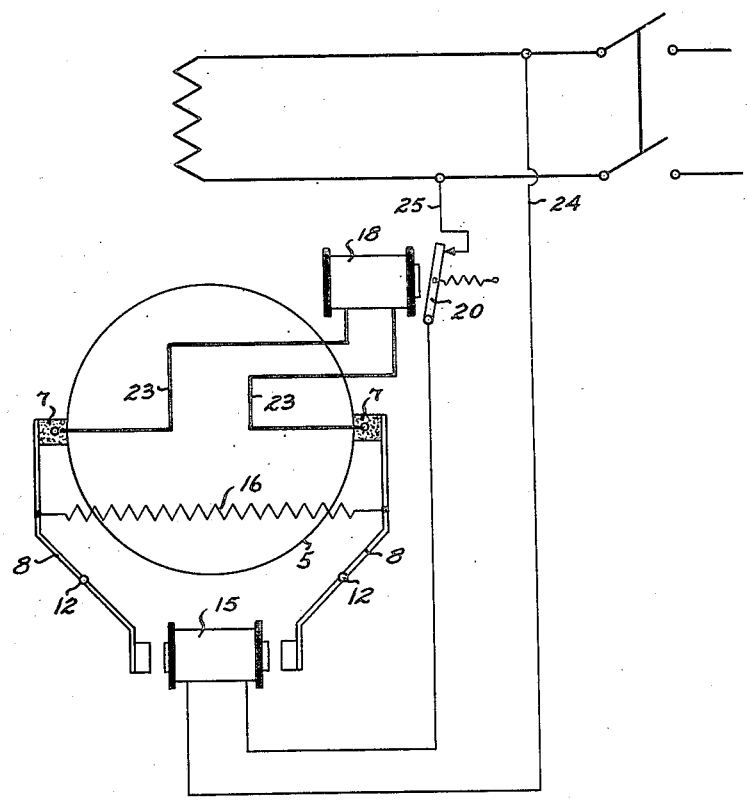

In the drawings, Fig. 1 is an end view of a preferred form of my device showing its application to the commutator of an electric motor of the class described; Fig. 2 is a sectional view of Fig. 1 taken along the line 2—2; Fig. 3 is an end view of a modified form of my device; Fig. 4 is a sectional view taken along the line 4—4 in Fig. 3, and Fig. 5 is a diagram of connections and wiring, based on the construction appearing in Fig. 1.

Referring by numerals to the drawings, 5 represents the commutator of an electric motor of the class described, carried by shaft 6. Brushes of any suitable type are shown at 7 preferably carried by means of brush holders 8 and preferably insulated therefrom by means of insulating members 9 adapted to contain the brushes. The brushes 7 are preferably rigidly held in member 9 by some means such as clamping screw 10 and are preferably slotted, as shown, to provide for movement through the member 9, when screw 10 is loosened, to take up for wear. Members 9 are preferably rigidly attached to brush holders 8 in any suitable manner. The brush holders 8 are preferably pivoted to a suitable bracket 11 by means of pin 12 and are preferably independently movable about this pivot. Bracket 11 may be attached in any suitable manner to any of the stationary parts (not shown) of the motor, such as the frame, bearing arm or the like. It is necessary that the brush holders 8 be constructed of material having good magnetic permeability or that they be provided with inserts, such as those shown at 13, having such permeability. A spring or other resilient member 16 of suitable tension preferably connects holders 8. A yoke 14 of magnetically permeable material is preferably carried by bracket 11 and is preferably provided with electromagnetic windings 15. The brush holders 8 or the inserts 13 form the armatures for these windings. A second yoke 17 of magnetically permeable material is preferably provided, carried by bracket 11 and this yoke preferably carries an electromagnetic winding 18. The magnetic circuit for coil 18 is preferably completed through yokes 14 and 17, member 19 preferably attached to yoke 14, and armature 20. The armature 20 is preferably carried by means of spring-support 21 attached to member 19. Spring 21 is preferably of such tension that when the coil 18 is energized, the armature 20 will quickly move into a position to open the circuit between parts 21 and 22. When coil 18 is not energized, armature 20 will move outwardly under the action of spring 21 to make contact with contacting finger 22 which is preferably rigidly attached to yoke 14 or some other suitable support and insulated therefrom. The brushes 7 are preferably connected with each other through coil 18 by means of conductors 23 so that this coil is energized by means of the induced armature current. The coils 15 are preferably connected in parallel and conductor 24 preferably serves to connect one side of the coil windings to one side of the line on the motor side of the starting switch (not shown); and conductor 25 preferably serves to connect the other side of the coil windings through spring 21 and contact finger 22 to the other side of the line on the motor side of the starting switch (not shown).

The operation of my device is as follows:

When the motor is at rest the brushes 7 are held against the commutator 5 due to the weight of the brush holders 8 and the tension of spring 16. Upon closing the motor starting switch, shown diagrammatically in Fig. 5, the motor field becomes energized and an induced voltage is set up in the armature winding, hence across the brushes 7. Since the brush circuit is completed through the conductors 23 and the relay coil 18, this device is actuated to open position, and the circuit 25 of the brush actuating coils 15 is broken. It will appear that closing the line switch causes the coils 18 and 15 to be concurrently energized, the former by the induced armature current and the latter by reason of connection across the line. However, the inductances of coils 15 and 18 are by preference so determined upon that the induced armature current, acting on coil 18, will serve to actuate armature 20 somewhat in advance of any actuation of levers 8 by coil 15. This time interval between initial movements of armature 20 and levers 8 may be further accentuated by differences in loading of springs 21 and 16, differences in air gaps, and also due to the relatively low inertia of armature 20 because of which this member tends to be actuated prior to any operation of the brush lifting device, since the circuit 25 is broken before the lifting mechanism has time to be actuated.

When the motor attains a predetermined speed, any suitable, preferably speed-responsive, device of known type, a contact portion of which is shown at 31, may be employed to short circuit the commutator, and hence the brushes, after which the machine operates as an induction motor. Immediately upon the short circuiting of the commutator, the current in conductors 23 and coil 18 is reduced practically to zero. The armature 20 is then released and moves outwardly under the action of spring 21 to close the circuits supplying coils 15. Coils 15, on becoming energized, pull the brush holders 8, together with brushes 7, away from the commutator, thereby putting the brushes out of action. On opening the motor switch, the coils 15 become de-energized and brushes 7 drop down onto the commutator in their starting position again.

In the modified device shown in Figs. 3 and 4, the brushes 7 are preferably made to fit loosely in insulated members 9 and are preferably held against commutator 7 by some means such as springs 26. Member 9 is preferably slotted, as at 27, to receive pin 28 set in brushes 7, so as to permit a certain amount of up and down movement of the brushes and also to permit the brushes to be lifted when the holders 8 are lifted. Where holders 8 are of non-permeable material they are preferably provided with magnetically permeable inserts adapted to register respectively with projections 30 on yoke 14. A plurality of windings or coils 18 are preferably provided, one on each of the projections 30 and connected in series with each other and with the brushes by means of conductors 23. Coils 15 are preferably connected in parallel and are preferably connected directly to the line on the motor side of the starting switch (not shown) through leads 24 and 25. The operation of this modified device is substantially the same as that of the device shown in Figs. 1 and 2. The brushes are held against the commutator when the motor is at rest by the weight of the brush holders 8 and the tension of spring 16. When the starting switch (not shown) is closed, the coils 15 become energized, but their pull is not sufficient to lift the brushes off the commutator against the combined action of the coils 18, the weight of the brushes and holders, and the tension of spring 16. Coils 18 are energized by the short circuit current, as in the form shown in Figs. 1 and 2, and the air gap between members 29 and 30 in the magnetic circuit of these coils is preferably made small so as to increase the pull of these magnetic windings. When the short-circuiting device (not shown) comes into action to short circuit the commutator, coils 18 are practically de-energized, thereby making their pull on the holders 8 practically zero and permitting coils 15 to raise the brushes off the commutator.

I claim:

1. In a motor including brushes, an armature and brush-lifting mechanism, electromagnetic means connected across said brushes and arranged for controlling said mechanism by armature current through the brushes.

2. In an electric motor, brushes associated with a rotating portion of the motor, electro-magnetic means for lifting said brushes, and means including said brushes, for controlling said electro-magnetic means by currents induced in a rotatable portion of the motor.

3. In an electric machine employing brushes, pivoted brush-holders therefor, electro-magnetically operated lifting means for said brush-holders and means connected across said brushes for controlling said lifting means.

4. In a brush-lifting mechanism for a motor including an armature and brushes, brush-holders therefor, electro-magnetically operated means for lifting said brush-holders, electro-magnetically operated controlling means for said lifting means, said controlling means being energized through said brushes responsively to currents induced in said armature.

5. In an electric machine employing a plurality of brushes, a brush-holder for each of said brushes, electro-magnetic lifting means for said brush-holders, resilient means associated with said brush-holders and adapted to oppose the action of said lifting means, electro-magnetically operated controlling means for said lifting means, said controlling means being connected across said brushes.

6. In an electric motor, brushes, a brush lifting mechanism, a commutator, a commutator short-circuiting device, and electro-magnetic means for controlling said mechanism responsively to the position of said short-circuiting device.

7. In an electric motor, a source of current for operating the motor, an armature, brushes, a brush lifting mechanism, electro-magnetic means for operating and controlling said mechanism, certain of said means being energized by the source of current for normally operating said motor and other of said means being connected across said brushes and energized entirely by current induced within said armature.

8. In a device of the class described, a rotatable armature, a plurality of brushes arranged to be moved into and out of engagement with the armature, a brush holder for each of said brushes, electro-magnetically operated lifting means for said brush holders and means controlled by induced armature current through said brushes to render said lifting means inoperative.

9. In a device of the class described, a rotatable armature, a plurality of brushes, arranged to be moved into and out of engagement with the armature, a brush holder for each of said brushes, electro-magnetically operated lifting means for said brushes, and electro-magnetic means connected across said brushes and energized by current induced in said armature, said last named means being adapted upon energization, to render said lifting means inoperative.

10. In a device of the class described, a rotatable armature, means for inducing a current therein, a plurality of brushes, arranged to be moved into and out of connection with the armature, a brush holder for each of said brushes, electro-magnetic brush-lifting means, resilient means operatively associated with said brush holders, adapted to oppose the action of said lifting means, and translating means connected across a pair of said brushes, said translating means being energized by induced armature current and arranged, upon energization, to render said lifting means inoperative.

11. In a device of the class described, a rotatable armature, a commutator, a plurality of brushes, arranged to be moved into and out of engagement with the commutator, brush holders therefor, electro-magnetic brush lifting means, a source of energizing current for said lifting means, arranged for inducing current in said armature, a second electro-magnetic means connected across a pair of said brushes and energized by the induced armature current and means movable into and out of engagement with the commutator for deenergizing said second named electro-magnetic means whereby said lifting means is rendered operative.

12. In a device of the class described, including a commutator and a short circuiting device associated therewith, a plurality of brushes, a brush holder for each of said brushes, electro-magnetic lifting means therefor, a resilient member common to said holders and adapted to oppose the action of said lifting means; and electro-magnetic means, coacting with said short-circuiting device for controlling the action of said lifting means.

GORDON R. ANDERSON.